(12) United States Patent
  Wronski

(10) Patent No.: US 11,702,014 B2
(45) Date of Patent: *Jul. 18, 2023

(54) SWINGABLE VEHICLE ACCESSORY MOUNT ASSEMBLY

(71) Applicant: NRTV Collab Inc., Orange, CA (US)

(72) Inventor: Luke Benjamin Wronski, Orange, CA (US)

(73) Assignee: NRTV Collab, Inc., Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,235

(22) Filed: Apr. 23, 2021

(65) Prior Publication Data

US 2021/0237658 A1 Aug. 5, 2021

Related U.S. Application Data

(63) Continuation-in-part of application No. 16/654,927, filed on Oct. 16, 2019, now Pat. No. 11,220,303.

(60) Provisional application No. 62/746,469, filed on Oct. 16, 2018, provisional application No. 63/015,824, filed on Apr. 27, 2020.

(51) Int. Cl.
  *B60R 9/06* (2006.01)
  *B62D 43/02* (2006.01)

(52) U.S. Cl.
  CPC ............... *B60R 9/06* (2013.01); *B62D 43/02* (2013.01)

(58) Field of Classification Search
  CPC .. B62D 43/02; B60D 1/54; B60R 9/10; B60R 9/06

USPC .................................... 224/509, 519
See application file for complete search history.

(56) References Cited

U.S. PATENT DOCUMENTS

| | | | |
|---|---|---|---|
| 3,753,520 A | 8/1973 | Bodde | |
| 3,845,891 A | 11/1974 | Becher | |
| 5,094,373 A * | 3/1992 | Lovci | B62D 43/02 224/535 |
| 5,114,120 A * | 5/1992 | Bartelt | B60R 9/06 37/231 |
| 5,358,157 A | 10/1994 | Abretske | |
| 5,518,159 A * | 5/1996 | DeGuevara | B60R 9/10 224/512 |
| 5,538,168 A | 7/1996 | Burger et al. | |
| 5,544,799 A * | 8/1996 | Didlake | B60R 9/06 224/523 |
| 5,664,717 A * | 9/1997 | Joder | B60R 9/06 224/532 |

(Continued)

*Primary Examiner* — Nathan J Newhouse
*Assistant Examiner* — Lester L Vanterpool
(74) *Attorney, Agent, or Firm* — Knobbe, Martens, Olson & Bear LLP

(57) ABSTRACT

A swingable accessory mount assembly includes a receiver mount configured for mounting to a hitch receiver of a vehicle. A first end of a first arm is attached to the receiver mount. The first arm extends laterally from the receiver mount to the second end. A first end of a second arm is pivotally attached to or near the second end of the first arm. The second arm is movable between a closed position and an open position relative to the first arm. A hitch adapter is attached to or near a second end of the second arm. When in the closed position, the hitch adapter is located on an opposite lateral side of the receiver mount from the second end of the first arm. A support member, such as a wear block, is located between the first arm and the second arm in the closed position.

24 Claims, 10 Drawing Sheets

(56) References Cited

U.S. PATENT DOCUMENTS

| | | | | |
|---|---|---|---|---|
| 5,713,501 A * | 2/1998 | Yokoyama | | B62D 43/02 |
| | | | | 224/42.21 |
| 5,806,736 A * | 9/1998 | Kincart | | B60R 9/06 |
| | | | | 224/548 |
| 5,845,832 A * | 12/1998 | Eichmann | | B60R 9/06 |
| | | | | 224/495 |
| 6,123,498 A * | 9/2000 | Surkin | | B60R 9/06 |
| | | | | 224/924 |
| 6,189,748 B1 * | 2/2001 | Hutter | | B62D 43/002 |
| | | | | 224/42.28 |
| 6,199,735 B1 * | 3/2001 | Cothern | | B60R 9/10 |
| | | | | 224/509 |
| 6,237,823 B1 * | 5/2001 | Stewart | | B60R 9/065 |
| | | | | 224/523 |
| 6,386,410 B1 * | 5/2002 | Van Dusen | | B60R 9/06 |
| | | | | 224/535 |
| 6,701,913 B1 * | 3/2004 | LeDuc | | F24C 15/30 |
| | | | | 126/30 |
| 6,923,351 B2 | 8/2005 | Roehmer et al. | | |
| 7,261,229 B1 * | 8/2007 | Allen | | B60R 9/10 |
| | | | | 224/495 |
| 7,591,404 B2 * | 9/2009 | LeDuc | | B60R 9/06 |
| | | | | 126/276 |
| 7,631,791 B1 * | 12/2009 | Allen | | B60R 9/10 |
| | | | | 224/531 |
| 8,079,611 B2 * | 12/2011 | Schroeder | | B60D 1/06 |
| | | | | 280/472 |
| 8,286,843 B2 | 10/2012 | Bogoslofski et al. | | |
| 9,333,822 B1 * | 5/2016 | LaFave | | B60R 9/06 |
| 9,381,868 B2 * | 7/2016 | Anyan | | B60R 9/10 |
| 9,475,353 B2 * | 10/2016 | Mehlen | | B60R 9/065 |
| 10,328,862 B2 * | 6/2019 | Eichmann | | B60D 1/42 |
| 10,384,621 B2 * | 8/2019 | Mehlen | | B60R 9/10 |
| 10,479,284 B1 | 11/2019 | Salyer | | |
| 10,752,066 B2 * | 8/2020 | Rodriguez | | B60D 1/1675 |
| 2002/0084298 A1 | 7/2002 | Essig | | |
| 2004/0222261 A1 * | 11/2004 | Wilson | | B62D 43/002 |
| | | | | 224/42.21 |
| 2005/0133556 A1 * | 6/2005 | Bolin | | B60R 9/065 |
| | | | | 224/509 |
| 2006/0151555 A1 * | 7/2006 | Mills | | B60R 9/06 |
| | | | | 224/521 |
| 2006/0273125 A1 * | 12/2006 | Bogoslofski | | B60R 9/06 |
| | | | | 224/521 |
| 2006/0292915 A1 * | 12/2006 | Bogoslofski | | B60R 9/065 |
| | | | | 439/352 |
| 2009/0001109 A1 * | 1/2009 | Wilkins | | B60D 1/58 |
| | | | | 224/42.21 |
| 2010/0294819 A1 * | 11/2010 | Spera | | B60R 9/06 |
| | | | | 224/519 |
| 2011/0156369 A1 * | 6/2011 | Schroder | | B60D 1/54 |
| | | | | 280/491.1 |
| 2011/0278336 A1 | 11/2011 | Landrum | | |
| 2012/0292357 A1 * | 11/2012 | Tennyson | | B60R 9/06 |
| | | | | 224/521 |
| 2012/0305612 A1 * | 12/2012 | Bell, Jr. | | B60R 9/06 |
| | | | | 224/519 |
| 2015/0203049 A1 * | 7/2015 | Eichmann | | B60R 9/06 |
| | | | | 224/509 |

* cited by examiner

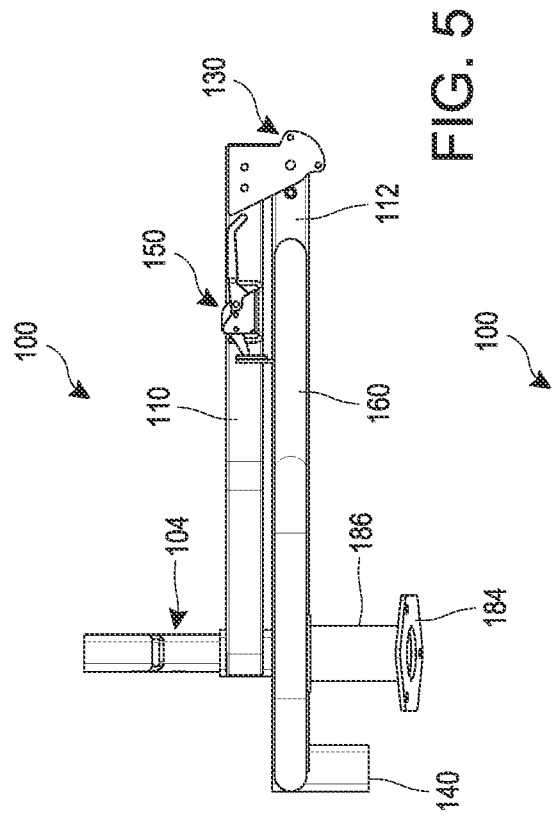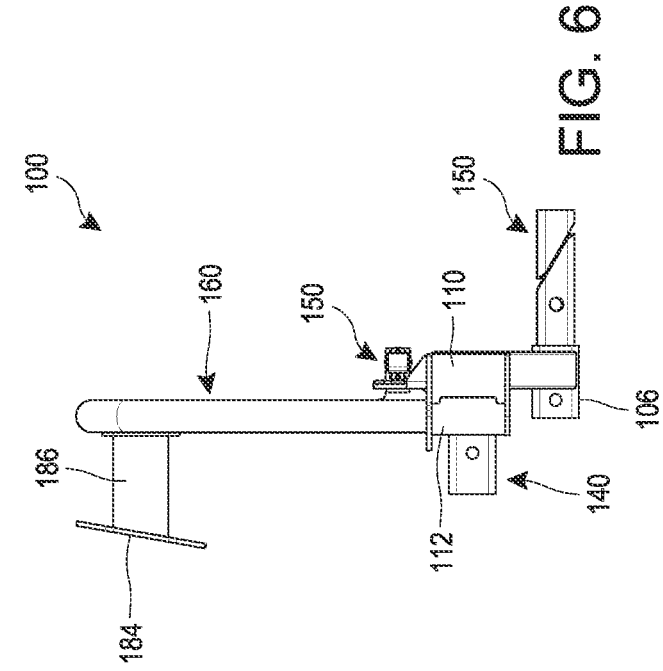

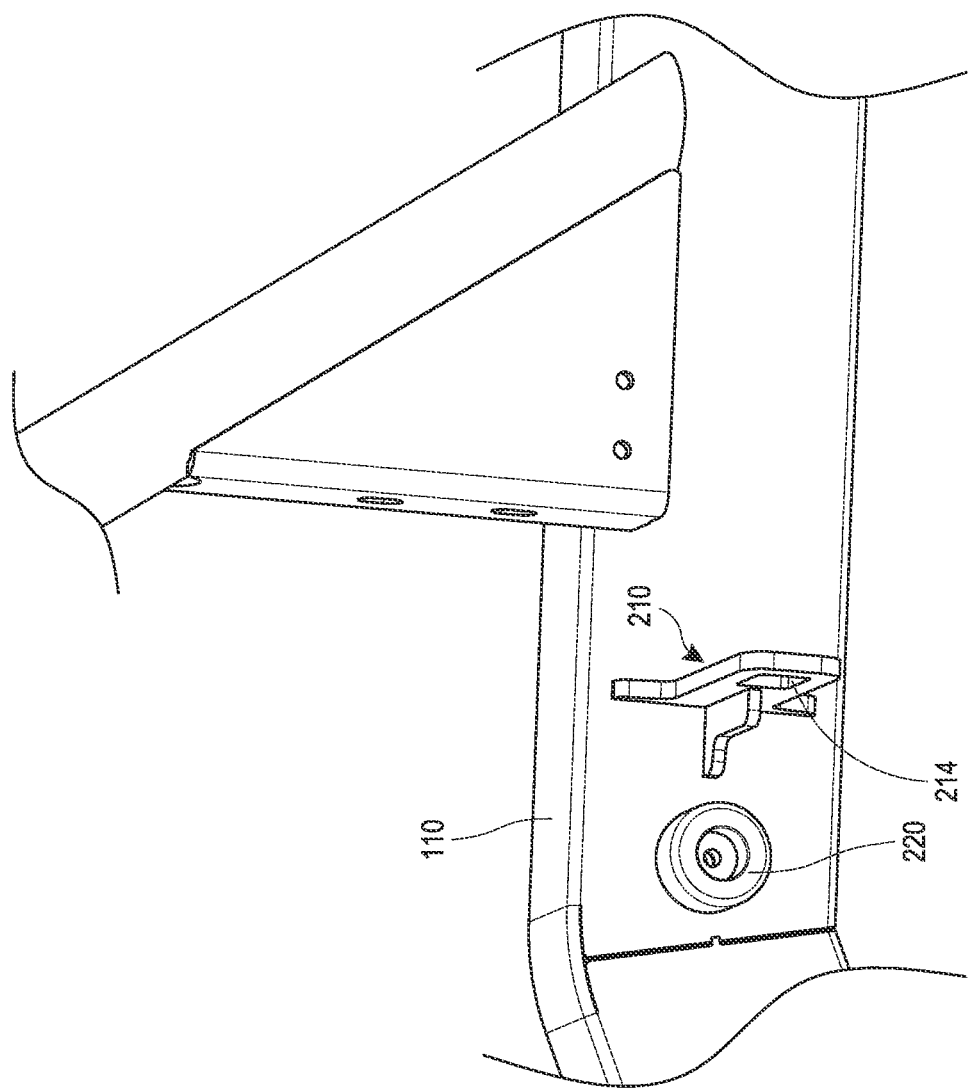

SWINGABLE VEHICLE ACCESSORY MOUNT ASSEMBLY

PRIORITY AND INCORPORATION BY REFERENCE

This application is a continuation-in-part of U.S. patent application Ser. No. 16/654,927, filed Oct. 16, 2019, titled SWINGABLE VEHICLE ACCESSORY MOUNT ASSEMBLY, which claims priority to U.S. Provisional Patent Application No. 62/746,469, filed Oct. 16, 2018, also titled SWINGABLE VEHICLE ACCESSORY MOUNT ASSEMBLY. This application also claims priority to U.S. Provisional Patent Application No. 63/015,824, filed Apr. 27, 2020, titled SWINGABLE VEHICLE ACCESSORY MOUNT ASSEMBLY. Each of these prior applications is hereby incorporated by reference herein in its entirety and made a part of the present disclosure.

BACKGROUND

Field

The present disclosure relates to vehicle accessories. In particular, the present disclosure relates to hitch-mounted accessory carriers.

Description of the Related Art

Many types of hitch-mounted accessory carriers exist. However, a need exists for arrangements that improve on one or more aspects of the prior art, or at least provide the public with a useful choice.

SUMMARY

The systems, methods and devices described herein have innovative aspects, no single one of which is indispensable or solely responsible for their desirable attributes. Without limiting the scope of the claims, some of the advantageous features will now be summarized.

In some implementations, a swingable accessory mount assembly includes a receiver mount configured for mounting to a hitch receiver of a vehicle. A first arm has a first end and a second end. The first end is attached to the receiver mount. The first arm extends laterally from the receiver mount to the second end. A second arm has a first end and a second end. The first end is pivotally attached to or near the second end of the first arm. The second arm is movable between a closed position and an open position relative to the first arm. A hitch adapter is attached to or near the second end of the second arm. When the second arm is in the closed position, the hitch adapter is located on an opposite lateral side of the receiver mount from the second end of the first arm.

In some implementations, the hitch adapter is located above the receiver mount.

In some implementations, one of the first arm and the second arm comprises a curved or angled portion and a horizontal portion.

In some implementations, the curved or angled portion is located closer to the receiver mount than the horizontal portion.

In some implementations, a lock-closed arrangement is configured to secure the second arm in the closed position.

In some implementations, a support bar has a first end and a second end each connected to the second arm, wherein the lock-closed arrangement is located at or near the first end of the support bar.

In some implementations, a gusset is provided between the second arm and the first end of the support bar. The gusset can at least partially cover the lock-closed arrangement when the accessory mount assembly is viewed from the rear. The gusset can at least partially support the lock-closed arrangement. At least a portion of the lock-closed arrangement can be located rearward of the gusset.

In some implementations, the lock-closed arrangement comprises a handle. The handle can be located on an opposite side of the support bar from the gusset.

In some implementations, the support bar has a vertical portion and a portion having a oblique angle relative to the second arm.

In some implementations, the portion having the oblique angle comprises the first end of the support bar or is located closer to the first end than the second end of the support bar.

In some implementations, a spare wheel mount is provided.

In some implementations, the spare wheel mount is supported on a support column. The support column can be located directly above the receiver mount.

In some implementations, the lock-closed arrangement comprises a lock tab carried by one of the first arm and the second arm and a cooperating aperture defined by the other of the first arm and the second arm. A lock pin extends through a lock-tab aperture of the lock tab and into the aperture.

In some implementations, the lock-closed arrangement comprises a lock eyelet carried by one of the first arm and the second arm and an aperture defined by the other of the first arm and the second arm. The lock eyelet extends through the aperture when the second arm is in a closed position relative to the first arm. An opening of the lock eyelet is exposed from the other of the first arm and the second arm. The opening is engaged by a latch.

In some implementations, the lock-closed arrangement comprises a lock eyelet carried by one of the first arm and the second arm and an aperture defined by the other of the first arm and the second arm. The lock eyelet extends through the aperture when the second arm is in a closed position relative to the first arm. An opening of the lock eyelet is exposed from the other of the first arm and the second arm. The opening is engaged by a latch.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 4 is a rear view of the accessory mount assembly of FIG. 1.

FIG. 5 is a top view of the accessory mount assembly of FIG. 1.

FIG. 6 is a side view of the accessory mount assembly of FIG. 1.

FIG. 10 is a perspective view of a portion of a front arm of the accessory mount assembly of FIG. 7 showing a locking eyelet or staple.

DETAILED DESCRIPTION

Figure 1:
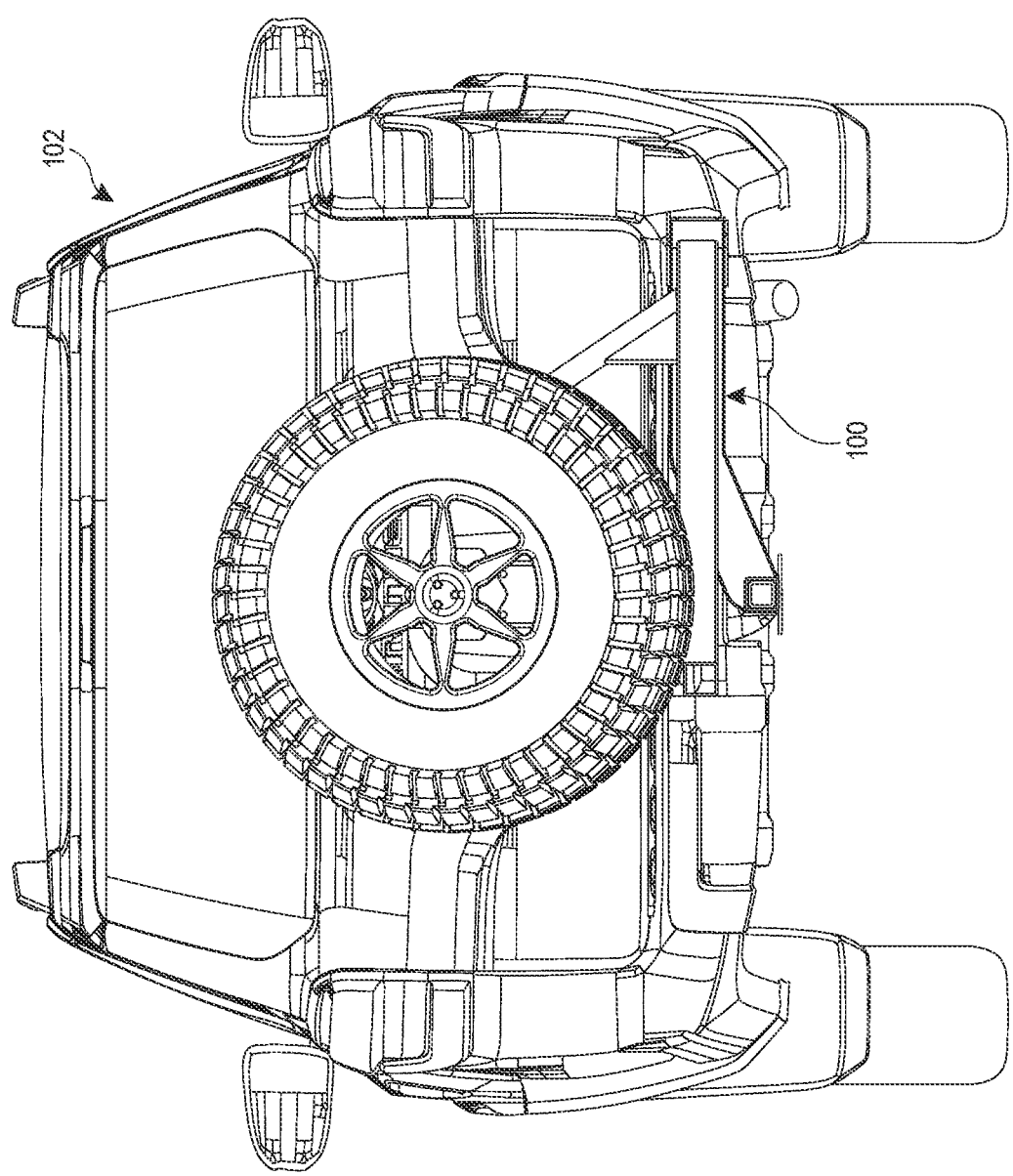
FIG. 1 is a rear view of a swingable accessory mount assembly attached to a hitch receiver of a vehicle.
Figure 2:
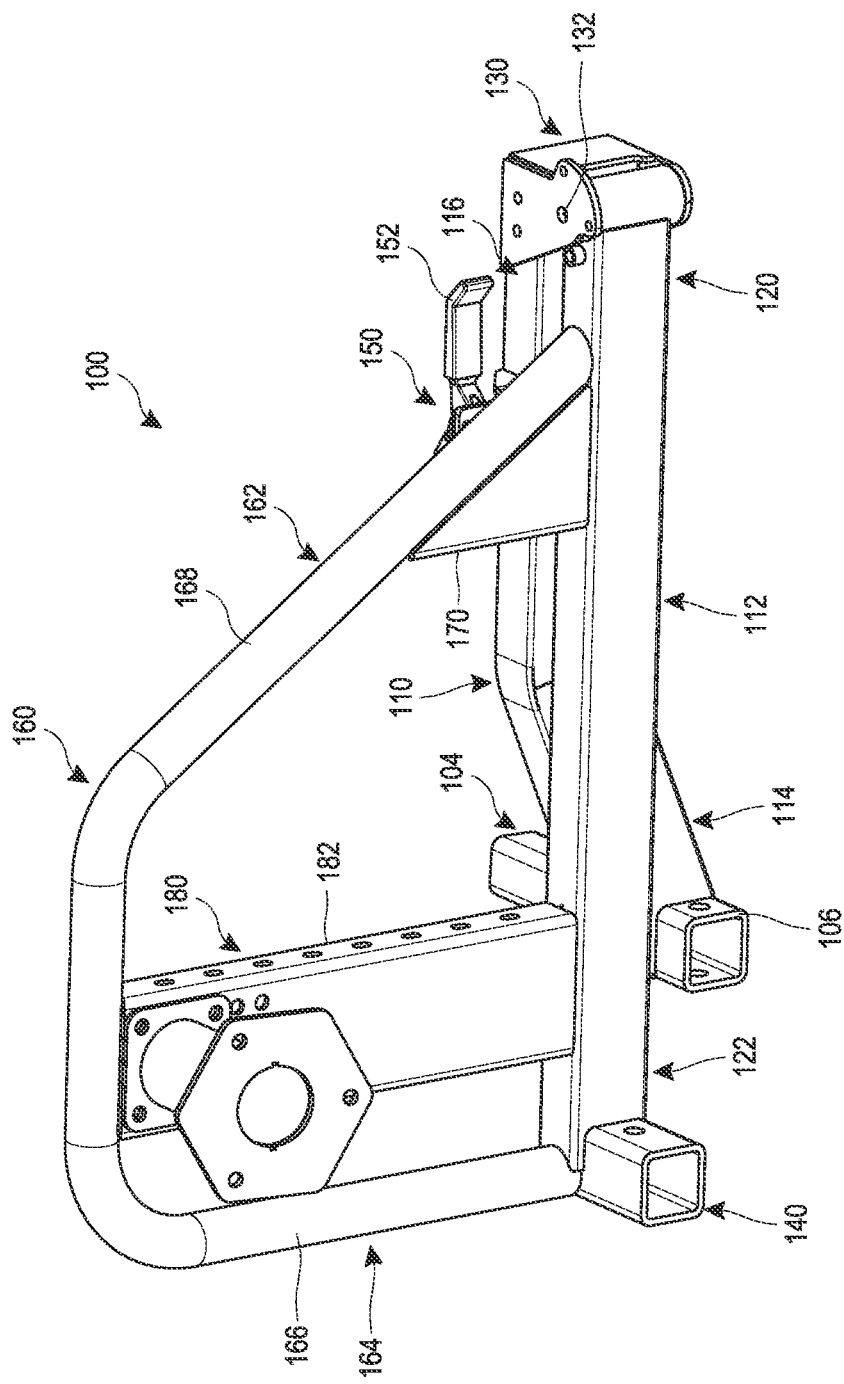
FIG. 2 is a rear perspective view of the accessory mount assembly of FIG. 1.
Figure 3:
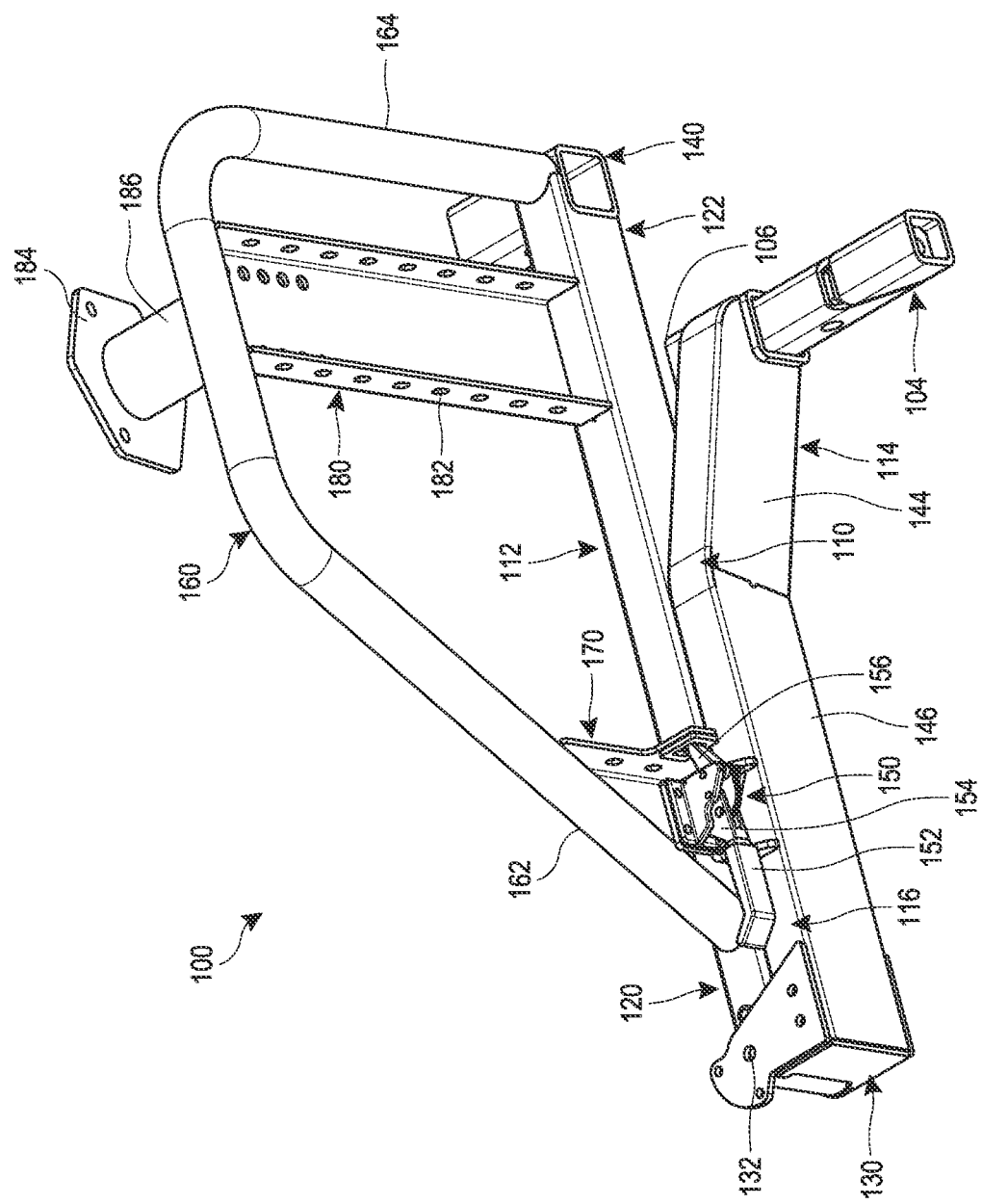
FIG. 3 is a front perspective view of the accessory mount assembly of FIG. 1.
Figure 7:
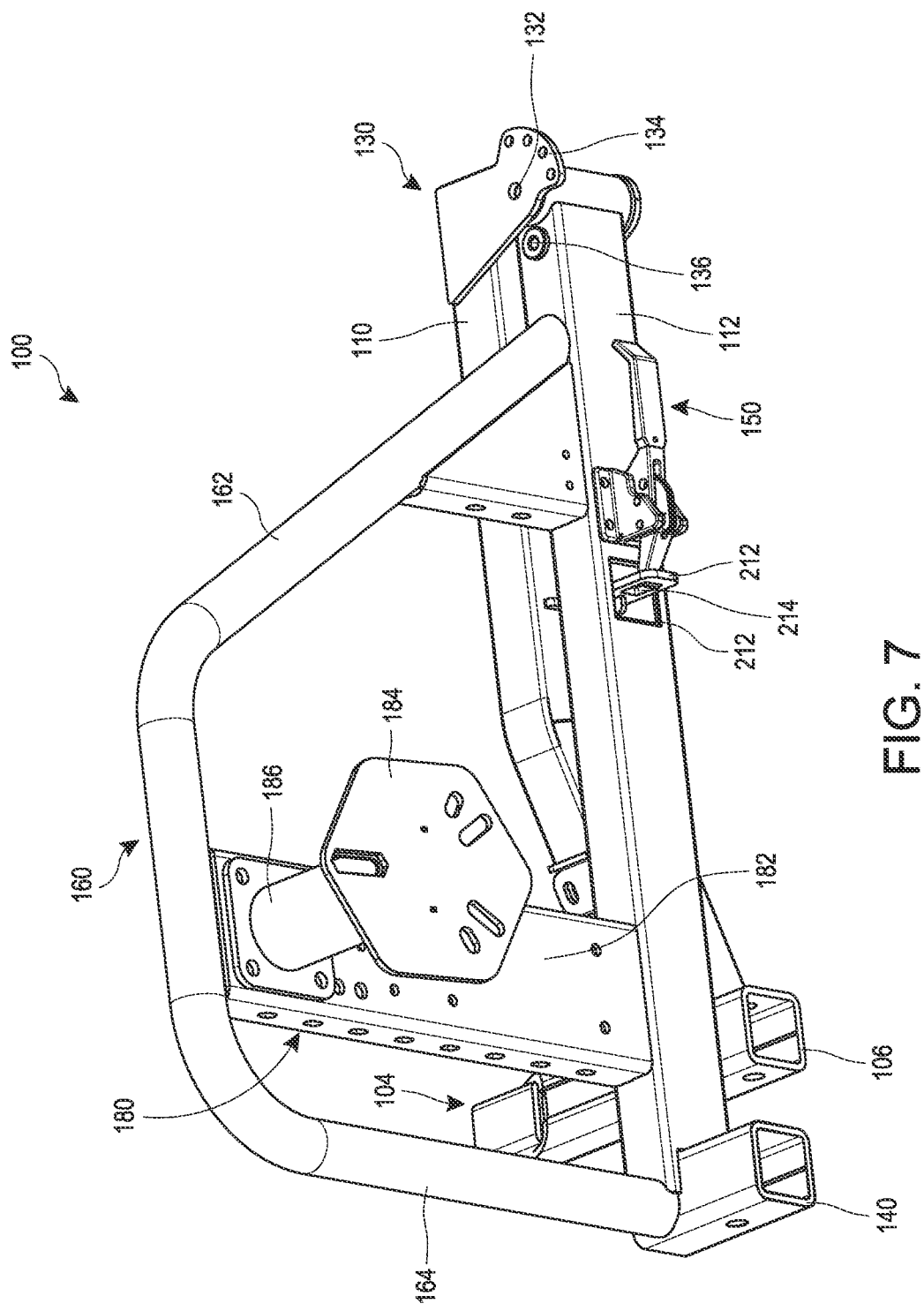
FIG. 7 is a rear perspective view of a modification of the accessory mount assembly of FIG. 1.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extend beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1-6 illustrate an implementation of a swingable accessory mount assembly 100 alone or mounted to a vehicle 102. In the illustrated arrangement, the accessory mount assembly 100 is configured for mounting to a hitch receiver of the vehicle 102. However, in other implementations, the accessory mount assembly 100 can be otherwise mounted or supported relative to the vehicle 102. In the illustrated arrangement, the accessory mount assembly 100 includes a receiver mount 104 configured for mounting to a hitch receiver of the vehicle 102. Optionally, the receiver mount 104 can include an outer end or rearward end that defines a standard (e.g., 2 inch) hitch receiver 106 to provide for auxiliary mounting of a receiver mount or an accessory having a receiver mount.

In the illustrated arrangement, the accessory mount assembly 100 has a first arm 110 and a second arm 112. The first arm 110 has a first end 114 and a second end 116. The first end 114 is attached to the receiver mount 104. The first arm 110 extends laterally from the receiver mount 104 to the second end 116. Accordingly, the first arm 110 preferably does not extend across the entire width of the vehicle 102. Preferably, the first arm 110 is located substantially on one half of the vehicle 102 in a width direction.

Figure 8:
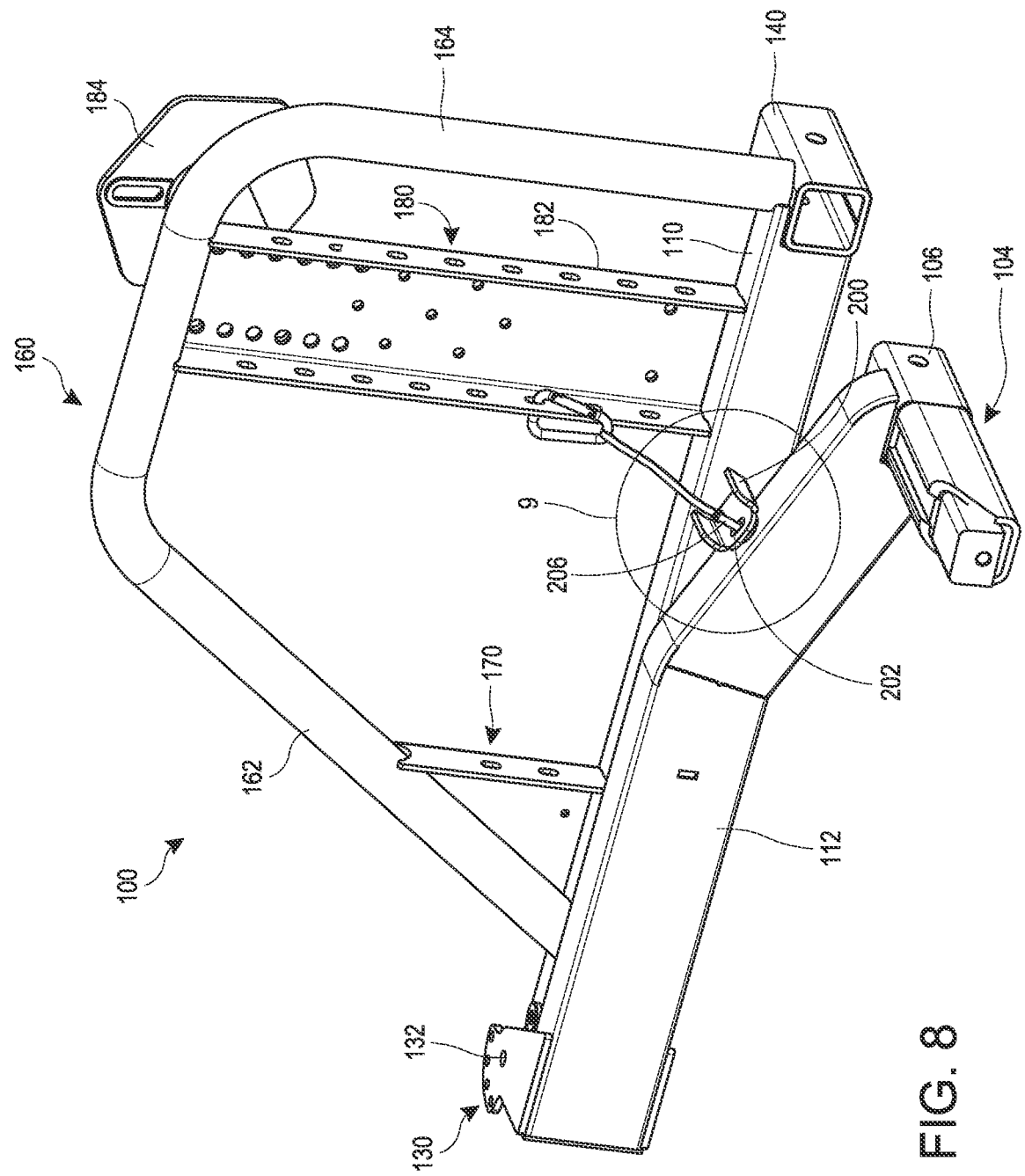
FIG. 8 is a front perspective view of the accessory mount assembly of FIG. 7.
Figure 9:
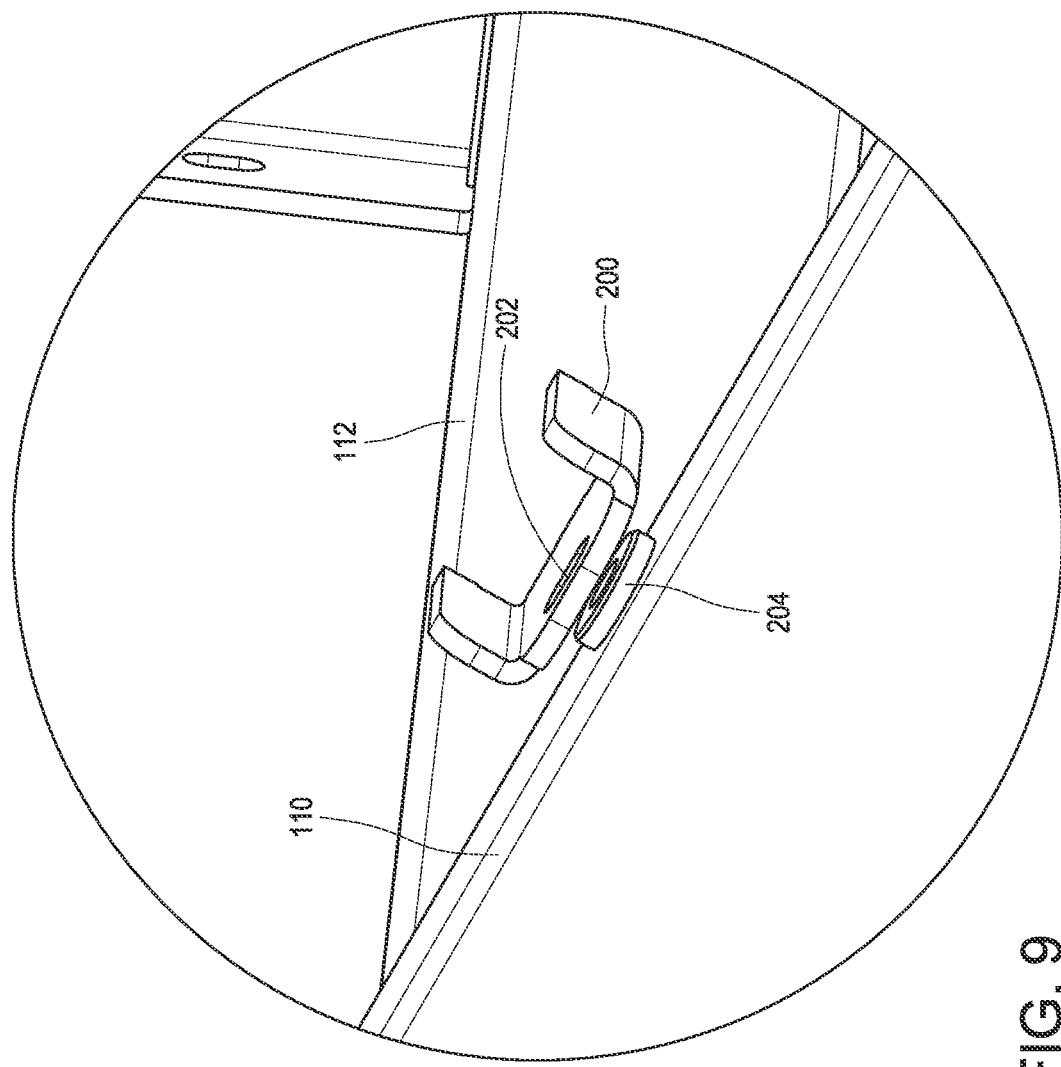
FIG. 9 is a perspective view of a portion of the accessory mount assembly shown in FIG. 8.
Figure 12:
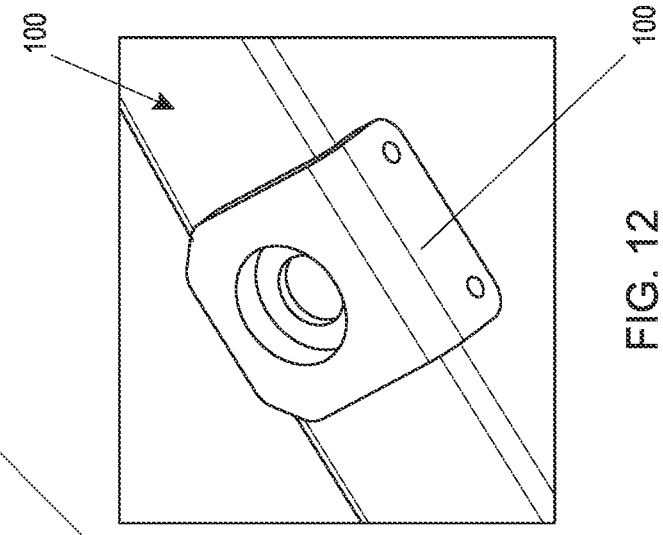
FIG. 12 is another perspective view of a portion of the accessory mount assembly and support member of FIG. 11.

The second arm 112 has a first end 120 and a second end 122. The first end 120 is pivotally attached to or near the second end 116 of the first arm 110. The second arm 112 is movable between a closed position and an open position relative to the first arm 110. In particular, a pivot assembly 130 provides for swinging or pivotal movement of the second arm 112 relative to the first arm 110. The illustrated pivot assembly 130 provides for rotational movement about a single pivot axis 132. However, in other arrangements, the pivot assembly 130 can provide for more complex movement, such as via a linkage arrangement. In addition, the pivot assembly 130 provides one or a plurality of lock positions for the open position of the second arm 112. A lock pin (e.g., 206—FIG. 8) can pass through the one or plurality of openings 134 and into an aperture 136 of the second arm 112. Preferably, the second arm 112 does not extend an entire width of the vehicle. However, in at least some implementations, the second arm 112 is longer than the first arm 110.

A hitch adapter 140 is attached to or near the second end 122 of the second arm 112. As used herein, "near" means closer to the identified location (e.g., end or side) than a location opposite the identified location of the relevant structure, or closer to the identified location than a center of the relevant structure. Thus, the hitch adapter 140 preferably is closer to the second end 122 than the first end 120, or closer to the second end 122 than a center of the second arm 112.

In the illustrated arrangement, when the second arm 112 is in the closed position, the hitch adapter 140 is located on an opposite lateral side of the receiver mount 104 relative to the second end 116 of the first arm 110, the first end 120 of second arm 112, or the pivot assembly 130. The hitch adapter 140 can be laterally offset from a centerline 142 (FIG. 4) of the receiver mount 104, an entirety of the internal cavity of the receiver mount 104 and/or an entirety of the receiver mount 104. In some configurations, the hitch adapter 140 is spaced away from the centerline 142, such as by about 3-12 inches, 3-8 inches or 3-6 inches. In the illustrated arrangement, the hitch adapter 140 is located above the receiver mount 104. Such an arrangement advantageously positions the hitch adapter 140 laterally and/or vertically offset from the receiver mount 104 such that both the hitch adapter 140 and the auxiliary hitch receiver 106 of the receiver mount 104 are usable.

In the illustrated arrangement, the first arm 110 comprises a curved or angled portion 144 and a horizontal portion 146. The curved or angled portion 144 is located closer to the receiver mount 104 than the horizontal portion 146. The curved or angle portion 144 can comprise or be located adjacent to the first end 114 and/or the horizontal portion 146 can comprise or be located adjacent to the second end 116. However, in other arrangements the second arm 112 can comprise a curved or angled portion 144 and a horizontal portion 146. In some such arrangements, the first arm 110 can be straight. Such an arrangement can allow a swinging door(s) of a vehicle to clear the first arm 110 while still providing access to standard hitch receiver 106.

In the illustrated arrangement, a lock-closed arrangement 150 is configured to secure the second arm 112 in the closed position relative to the first arm 110 and/or the receiver mount 104. The lock-closed arrangement 150 can be of any suitable arrangement, which can include a first portion coupled to the first arm 110 and a second portion coupled to the second arm 112. The lock-closed arrangement 150 can be spaced away from one or more of the pivot assembly 130, the receiver mount 104 and the hitch adapter 140.

In some implementations, a support bar 160 is connected to one of the arms 110, 112. In the illustrated arrangement, the support bar 160 is supported by the second arm 112. The support bar 160 has a first end 162 and a second end 164. In the illustrated arrangement, each of the first end 162 and the second end 164 is connected to the second arm 112. In some implementations, the support bar 160 has a vertical portion 166 and a portion 168 having an oblique angle relative to the second arm 112. In some implementations, the portion 168 having the oblique angle comprises or is adjacent to the first end 162 of the support bar 160 or is located closer to the first end 162 than the second end 164 of the support bar 160. The illustrated lock-closed arrangement 150 is located at or near the first end 162 of the support bar 160.

In the illustrated arrangement, a gusset 170 is provided between the second arm 112 and the first end 162 of the support bar 160. The gusset 170 can at least partially cover the lock-closed arrangement 150 when the accessory mount assembly 100 is viewed from the rear with the second arm 112 in a closed position. In other arrangements, the gusset 170 can support a portion or an entirety of the lock-closed arrangement 150. In some such arrangements, at least a portion of the lock-closed arrangement 150 can be located on a rearward side of the gusset 170 (a side opposite the vehicle 102 when the second arm 112 is in a closed position).

The illustrated lock-closed arrangement 150 comprises a handle 152, which can be configured to allow a user to release the lock and move the second arm 112 toward or to the open position. The handle 152 can be located on an opposite side of the support bar 160 from the gusset 170. With such an arrangement, the gusset 170 can visually block and/or protect a portion of the lock-closed arrangement 150, while leaving the handle 152 accessible to the user. The handle 152 can actuate a latch 154 of the lock-closed arrangement 150, such as through a linkage or other pivotal motion transfer arrangement. The lock-closed arrangement 150 can also include an eyelet or a staple 156 that is configured to be engaged by the latch 154. The eyelet or staple 156 can be carried by the gusset 170 or other portion of the second arm 112.

In some implementations, a spare wheel mount 180 is provided. In some implementations, the spare wheel mount 180 is supported on a support column or plate 182. The support column 182 can be located directly above the receiver mount 104. The spare wheel mount 180 can include a mounting plate 184, which can be oriented at an oblique angle. A tubular support 186 can support the mounting plate 184 at a rearwardly-spaced location from the support column 182. The illustrated arrangement allows for the provision of both the hitch adapter 140 and the wheel mount 180 with an efficient utilization of space.

FIGS. 7-10 illustrate a modification of the swingable accessory mount assembly 100 of FIGS. 1-6. The accessory mount assembly 100 of FIGS. 7-10 can the same as or substantially similar to the accessory mount assembly 100 of FIGS. 1-6, except as described herein. Accordingly, the same reference numbers are used to refer to corresponding or equivalent components or features.

The accessory mount assembly 100 of FIGS. 7-10 can include an alternative to the lock-closed arrangement 150 of the accessory mount assembly 100 of FIGS. 1-6. In particular, with reference to FIGS. 8 and 9, the accessory mount assembly 100 includes a lock tab 200 having an aperture 202 that is carried by the second arm 112. A portion of the first arm 110 can define or otherwise include an aperture 204 that aligns with the aperture 202 when the second arm 112 is closed relative to the first arm 110. A lock pin 206 can be passed through both apertures 202, 204 to secure the second arm 112 in the closed position relative to the first arm 110. The illustrated arrangement could also be reversed and the lock tab 200 could be carried by the first arm 110 and the aperture 204 could be defined by the second arm 112.

The accessory mount assembly 100 of FIGS. 7-10 can additionally or in the alternative include a latch arrangement on a rearward-facing surface of the accessory mount assembly 100. For example, the handle 152 and the latch 154 of the lock-closed arrangement 150 can be located on a rear surface of the second arm 112. The lock-closed arrangement 150 can include a lock eyelet or a staple 210 that is configured to be engaged by the latch 154. The lock eyelet or staple 210 can be carried by the first arm 110. The lock eyelet or staple 210 is positioned to pass through an aperture 212 that passes in a fore-aft direction through the second arm 112. An opening 214 of the lock eyelet or staple 210 is positioned rearwardly of the second arm 112 when the second arm 112 is in the closed position relative to the first arm 110. With such an arrangement, the latch 154 can engage the lock eyelet or staple 210 and the handle 152 can be easy to access for a user. Alternatively, the handle 152 and latch 154 could be omitted and a lock (e.g., a padlock) could be passed through the opening 214 to secure the second arm 112 in the closed position relative to the first arm 110. This arrangement could also be reversed.

With reference to FIG. 10, the facing surfaces of one or both of the first arm 110 and the second arm 112 can include one or more stops or bumpers 220 configured to establish a closed position of the first arm 110 relative to the second arm 112 and/or inhibit undesirable contact between the first arm 110 and the second arm 112. The stops or bumpers 220 can be configured to contact one another or a surface of the opposing arm 110, 112. Any desirable number of stops or bumpers 220 can be employed.

FIGS. 11-15 illustrate a modification of the swingable accessory mount assemblies 100 of FIGS. 1-6 and 7-10. The accessory mount assembly 100 of FIGS. 11-15 can the same as or substantially similar to the accessory mount assemblies 100 of FIGS. 1-6 and 7-10, except as described herein. Accordingly, the same reference numbers are used to refer to corresponding or equivalent components or features.

The swingable accessory mount assembly 100 includes a member 250 positioned between portions of the mount assembly 100, such as between the first arm 110 and the second arm 112. The member 250 can be secured to one of the portions, such as one of the first arm 110 and the second arm 112. The member 250 can be configured to contact the other of the portions, such as the other of the first arm 110 and the second arm 112, to provide a bumper surface or a stop surface and inhibit damage or excessive noise that would occur as a result of direction contact or relative movement (e.g., rattling) between the portions, such as the first arm 110 and the second arm 112.

In some configurations, the member 250 is a bumper, a stop, a wear block, or a support member (hereinafter "support member") that is configured to provide support for one of the portions relative to the other portion. For example, in the illustrated arrangement, the support member 250 is secured to the first arm 110 and provides support to the second arm 112 when the second arm 112 is in or near a closed position relative to the first arm 110. However, this arrangement could be reversed and the support member 250 could be secured to the second arm 112 and support the first arm 110. The support member 250 could also provide support between other portions of the mount assembly 100 or between the either of the first arm 110 and the second arm 112 and another portion of the mount assembly 100. In some configurations, the member 250 is a glide member that is configured to facilitate movement of the second arm 112 towards or to the closed position relative to the first arm 110. The illustrated member 250 is configured to provide both support and glide functions.

In the illustrated arrangement, the support member 250 is an injection molded structure that helps support the weight of the swing arm or second arm 112 when the second arm is in a closed position. The support member 250 can be constructed from any suitable plastic material, such a nylon or a similar material. As described, the support member 250 can be formed by an injection molded process or by any other suitable process.

The illustrated support member 250 includes a first wall 252, or a support wall, and a second wall 254, or an attachment wall. The attachment wall 254 includes a pair of apertures 256, each of which is configured to receive a fastener (e.g., a screw) that secures the support member 250 to the first arm 110 (or, alternatively, the second arm 112). The attachment wall 254 could include other numbers of apertures 256, as well. In some configurations, the support wall 252 could include apertures or other fastening structures in addition to or instead of the attachment wall 254. In some configurations, the attachment wall could be omitted.

Figure 14:
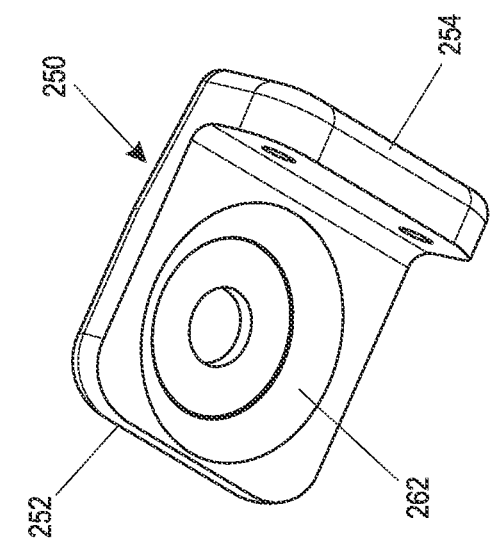
FIG. 14 is a perspective view of a bottom of the support member.
Figure 13:
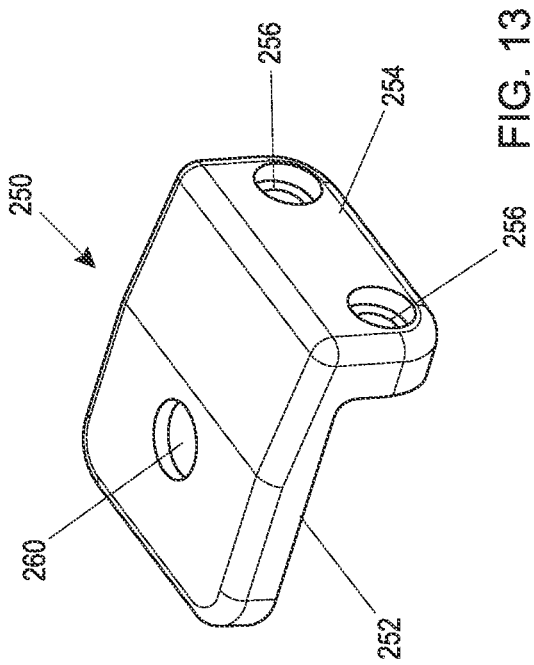
FIG. 13 is perspective view of a top of the support member.

In the illustrated arrangement, the support member 250 is configured to overlie the aperture 204 of the first arm 110 that is configured to receive the lock pin 206. Accordingly, the support wall 252 includes an aperture 260 that is configured to expose the aperture 204 and allow the lock pin 206 to be inserted through the aperture 260 of the support member 250 and into the aperture 204. In another configuration, the support member 250 could define or directly support a structure that defines the aperture 204 or the aperture otherwise configured to receive the lock pin 206 in a secured manner. With reference to FIG. 14, the bottom surface of the support wall 252 can include a recess 262 configured to accommodate a raised surface of the first arm 110 that defines the aperture 204 for the lock pin 206 if present.

Figure 11:
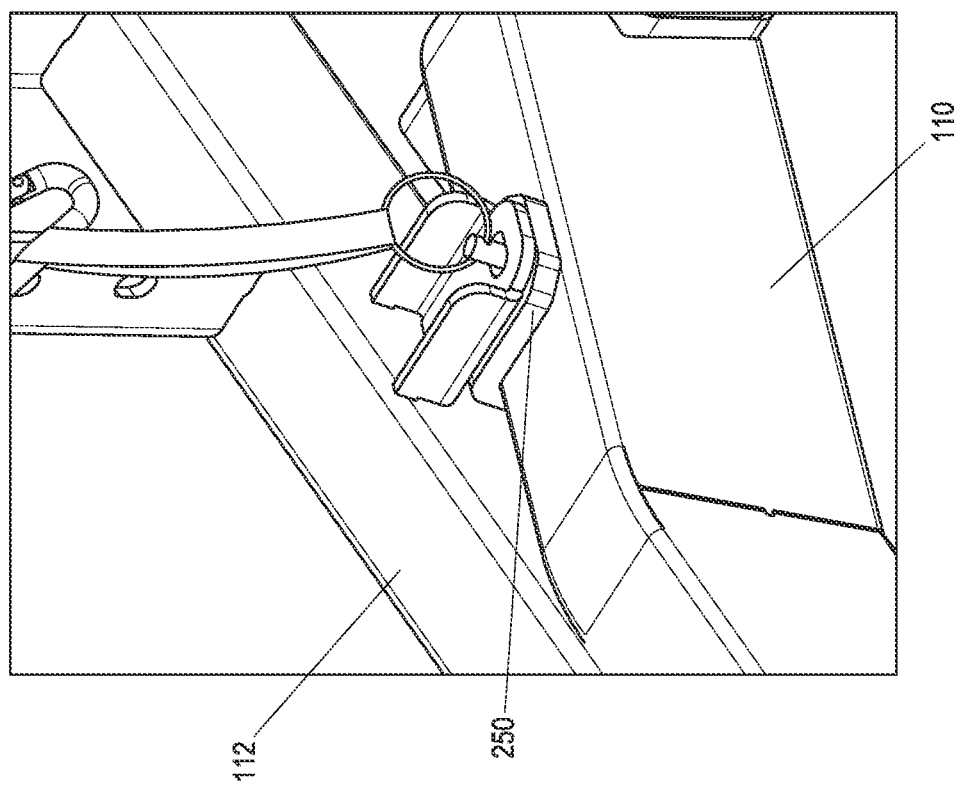
FIG. 11 is a perspective view of a portion of an accessory mount assembly including a support member between portions of the mount assembly.

With reference to FIG. 11, as described above, the illustrated support member 250 is configured to overlie the aperture 204 that receives the lock pin 206. Accordingly, support member 250 is positioned between the first arm 110 and the lock tab 200 of the second arm 112. In particular, the support wall 252 is positioned between the first arm 110 and the lock tab 200 of the second arm 112 and the attachment wall 254 is positioned between facing surfaces of the first arm 110 and the second arm 112. Thus, in some configurations, the attachment wall 254 can act as a stop between the first arm 110 and the second arm 112.

Figure 15:
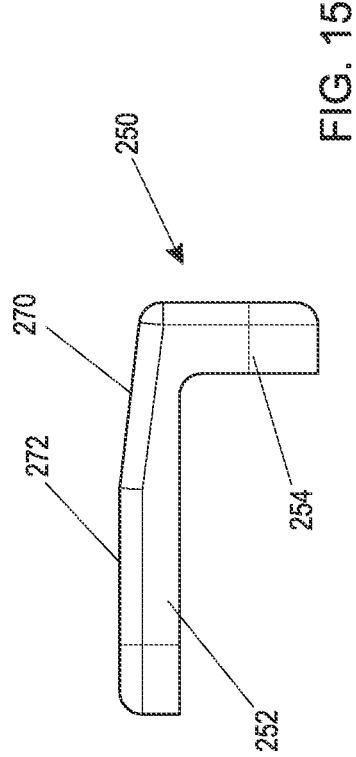
FIG. 15 is a side view of the support member.

With additional reference to FIG. 15, the outer or top surface of the support wall 252 includes at least a ramped surface portion 270. In the illustrated arrangement, the top surface of the support wall 252 includes a ramped surface 270 and a flat surface 272. The ramped surface 270 is positioned between the attachment wall 254 and the flat surface 272. In use, the lock tab 200 first approaches and/or encounters the ramped surface 270 when the second arm 112 is moved towards the first arm 110 and, thus, towards the closed position. If necessary, the ramped surface 270 can contact and guide the lock tab 200 toward and/or onto the flat surface 272. The lock tab 200 can rest on the flat surface 272 such that the support member 250 supports a portion of the weight of the second arm 112. In some configurations, the ramped surface 270 can be omitted.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A swingable accessory mount assembly, comprising:
a single receiver mount configured for mounting to a hitch receiver of a vehicle, wherein a centerline bisects the receiver mount in a vertical direction;
a first arm having a first end and a second end, the first end attached to the receiver mount, the first arm extending laterally from the receiver mount to the second end;
a second arm having a first end and a second end, the first end pivotally attached to or near the second end of the first arm, the second arm movable between a closed position and an open position relative to the first arm;
a hitch adapter attached to or near the second end of the second arm;
wherein, when the second arm is in the closed position, a center of the hitch adapter is offset from the centerline and is located on an opposite lateral side of the centerline from the second end of the first arm;
a wear block positioned between the first arm and the second arm when the second arm is in the closed position, the wear block having a first portion and a second portion, the first portion being located between a front surface of the first arm and a rear surface of the second arm and the second portion being located on an upper surface of the first arm.

2. The accessory mount assembly of claim 1, further comprising a lock-closed arrangement configured to secure the second arm in the closed position.

3. The accessory mount assembly of claim 2, further comprising a support bar having a first end and a second end each connected to the second arm, wherein the lock-closed arrangement is located at or near the first end of the support bar.

4. The accessory mount assembly of claim 3, wherein the support bar has a vertical portion and a portion having an oblique angle relative to the second arm, wherein the portion having the oblique angle comprises the first end of the support bar or is located closer to the first end than the second end of the support bar.

5. The accessory mount assembly of claim 1, further comprising a spare wheel mount supported on a support column, wherein the support column is located directly above the receiver mount.

6. The accessory mount assembly of claim 1, further comprising a lock tab carried by the second arm, wherein the lock tab is positioned above the second portion of the wear block when the second arm is in the closed position.

7. The accessory mount assembly of claim 6, wherein the second portion of the wear block comprises a ramped surface and a flat surface, the ramped surface being positioned closer to the second arm than the flat surface.

8. The accessory mount assembly of claim 7, wherein the lock tab rests on the second portion of the wear block in the closed position of the second arm such that the first arm supports a portion of a weight of the second arm.

9. The accessory mount assembly of claim 8, wherein the lock tab comprises a lock-tab aperture and a cooperating aperture is defined by the first arm, wherein a lock pin extends through the lock-tab aperture of the lock tab and into the cooperating aperture.

10. A swingable accessory mount assembly, comprising:
a receiver mount configured for mounting to a hitch receiver of a vehicle, wherein a vertical axis bisects the receiver mount in a vertical direction;
a first arm having a first fixed length between a first end and a second end, the first end attached to the receiver mount, the first arm extending laterally from the receiver mount to the second end;
a second arm having a second fixed length between a first end and a second end, the first end pivotally attached to the second end of the first arm, the second arm movable about a single pivot axis between a closed position and an open position relative to the first arm;
a hitch adapter located at the second end of the second arm;
wherein, when the second arm is in the closed position, a center of the hitch adapter is offset from the vertical axis and is located on an opposite lateral side of the vertical from the second end of the first arm;
a lock-closed arrangement configured to secure the second arm in a closed position relative to the first arm, the lock-closed arrangement comprising a first lock and a second lock, the first lock comprising a lock tab carried by the second arm, the lock tab including a lock-tab aperture, the first lock further comprising a cooperating aperture defined by the first arm and a lock pin that extends through the lock-tab aperture of the lock tab and into the cooperating aperture, wherein the second lock comprises a lock eyelet carried by one of the first arm and the second arm, wherein the lock eyelet is engaged by a handle-actuated latch carried by the other of the first arm and the second arm.

11. The accessory mount assembly of claim 10, wherein the first arm comprises an angled portion and a horizontal portion, wherein the angled portion extends upwardly from the receiver mount and the horizontal portion extends laterally between the angled portion and the second end of the first arm, and wherein the second arm is linear such that the hitch adapter is located above the receiver mount.

12. The accessory mount assembly of claim 11, wherein the cooperating aperture is located on the angled portion of the first arm and the lock tab is located on a rear surface of the second arm, the lock tab being oriented at an angle corresponding to an angle of the angled portion of the first arm.

13. The accessory mount assembly of claim 10, further comprising a support bar having a first end and a second end each connected to the second arm, wherein the first end of the support bar is located closer to the first end of the second arm than the second end of the support bar, wherein the support bar has a vertical portion and a portion having an oblique angle relative to the second arm.

14. The accessory mount assembly of claim 13, wherein the portion having the oblique angle comprises the first end of the support bar or is located closer to the first end than the second end of the support bar.

15. The accessory mount assembly of claim 14, further comprising a spare wheel mount.

16. The accessory mount assembly of claim 15, wherein the spare wheel mount is supported on a support column, wherein the support column is located between the first end and the second end of the support bar and closer to the second end than the first end.

17. The accessory mount assembly of claim 10, further comprising a bumper between the first arm and the second arm.

18. A swingable accessory mount assembly, comprising:
a receiver mount configured for mounting to a hitch receiver of a vehicle, wherein a vertical axis bisects the receiver mount in a vertical direction;
a first arm having a first fixed length between a first end and a second end, the first end attached to the receiver mount, the first arm extending laterally from the receiver mount to the second end;
a second arm having a second fixed length between a first end and a second end, the first end pivotally attached to the second end of the first arm, the second arm movable about a single pivot axis between a closed position and an open position relative to the first arm;
a lock-closed arrangement configured to secure the second arm in a closed position relative to the first arm, the lock-closed arrangement comprising a latch having a first portion on the first arm and a second portion on the second arm, wherein the first portion engages the second portion in the closed position of the second arm and the latch is actuated by a handle carried by the second arm, the second arm comprising an opening between the first end and the second end of the second arm and between an upper surface and a lower surface of the second arm, and wherein the lock-closed arrangement passes through the opening.

19. The accessory mount assembly of claim 18, wherein the handle of the lock-closed arrangement actuates a linkage.

20. The accessory mount assembly of claim 18, the lock-closed arrangement comprising a lock tab carried by one of the first arm and the second arm, the lock tab including a lock-tab aperture, the lock-closed arrangement further comprising a cooperating aperture defined by the other of the first arm and the second arm, the lock-closed arrangement further comprising a lock pin that extends into each of the lock-tab aperture of the lock tab and the cooperating aperture.

21. The accessory mount assembly of claim 18, further comprising a support portion having a first end and a second end each originating from the second arm, wherein the first end of the support portion is located closer to the first end of the second arm than the second end of the support portion, wherein the support portion has a vertical portion and a portion having an oblique angle relative to the second arm.

22. The accessory mount assembly of claim 21, wherein the portion having the oblique angle comprises the first end of the support portion or is located closer to the first end than the second end of the support portion.

23. The accessory mount assembly of claim 22, further comprising a spare wheel mount, wherein the spare wheel mount is supported on a support column located between the first end and the second end of the support portion and closer to the second end than the first end.

24. The accessory mount assembly of claim 18, further comprising a hitch adapter located at the second end of the second arm.

* * * * *